United States Patent [19]

Takeuchi et al.

[11] Patent Number: 5,580,312
[45] Date of Patent: Dec. 3, 1996

[54] DAMPER DISK ASSEMBLY

[75] Inventors: Hiroshi Takeuchi; Masahiko Iwase, both of Neyagawa, Japan

[73] Assignee: Kabushiki Kaisha Daikin Seisakusho, Neyagawa, Japan

[21] Appl. No.: 255,116

[22] Filed: Jun. 7, 1994

Related U.S. Application Data

[63] Continuation of Ser. No. 980,674, Nov. 24, 1992, abandoned.

[30] Foreign Application Priority Data

Nov. 25, 1991 [JP] Japan .................. 3-096539 U

[51] Int. Cl.[6] .................. F16D 3/14; F16D 13/64
[52] U.S. Cl. .................. 464/68
[58] Field of Search .................. 464/66, 67, 68, 464/64; 192/106.1, 106.2, 212, 213.11, 213.3, 214, 70.17; 74/574

[56] References Cited

U.S. PATENT DOCUMENTS

| | | | |
|---|---|---|---|
| 4,000,794 | 1/1977 | Wörner | 464/68 X |
| 4,044,874 | 8/1977 | Wörner | 192/106.2 |
| 4,285,423 | 8/1981 | Fädler et al. | 192/106.2 |
| 4,354,586 | 10/1982 | Stanley | 192/106.2 |
| 4,533,031 | 8/1985 | Nagano | 464/68 X |
| 4,548,310 | 10/1985 | Maucher | 464/68 X |
| 4,573,562 | 3/1986 | DeLand | 464/68 X |
| 4,669,595 | 6/1987 | Fischer et al. | 464/68 X |
| 4,789,053 | 12/1988 | Fischer et al. | 464/68 X |
| 5,059,155 | 10/1991 | Tojima | 464/68 |

*Primary Examiner*—Daniel P. Stodola
*Assistant Examiner*—Eileen A. Dunn
*Attorney, Agent, or Firm*—Knobbe Martens Olson & Bear

[57] ABSTRACT

A damper disc assembly comprises an input rotation member, a flanged hub connectable to an output member, an elastic member elastically connecting the input rotation member and the hub flange, a plurality of friction members and an regulator. The plurality of friction members are sandwiched between the input rotation member and the hub flange and develop hysteresis torque when the input rotation member rotates relative to the hub. The regulator enables a select number friction members to be functional depending on whether the damper assembly responds to phases of twisting of the input rotation member relative to the hub flange in either a direction positive or negative with respect to the rotation of the input rotation member.

11 Claims, 7 Drawing Sheets

DAMPER DISK ASSEMBLY

This application is a continuation of application Ser. No. 07/980,674, filed Nov. 24, 1992, now abandoned.

BACKGROUND OF THE INVENTION

The present invention relates to a damper disc assembly, particularly to a damper disc assembly having a plurality of friction members inducing hysteresis torque.

The damper disc assembly is employed in the clutch disc assembly of a clutch located between an automobile engine and transmission. Such a damper disc generally is composed of a flanged hub connectable to the transmission main drive shaft, an input rotation member such as a clutch plate and a retaining plate, and elastic members such as coil springs making circumferentially elastic connection of the input rotation member with the hub flange, and friction members such as friction discs sandwiched between the input rotation member and the hub flange.

Torsional vibration twists the input rotation member relative to the hub, and is transmitted from the input rotation member to the elastic members. The elastic members thus deform and the friction members counterslide, effecting torsional vibration damping. Therein, with regard to the torsional characteristics (torsional angle versus torque response) of the damper disc assembly, hysteresis torque is induced depending on the characteristics of the friction members. Generally, the torsional characteristics in operation are such that the hysteresis torque response through the extent of a phase of positive torsioning and that through the extent of a phase of negative torsioning are the same. In defining the torsional characteristics, positive torsioning phase refers to a twisted condition of the input rotation member relative to the hub in the engine rotation direction, and negative torsioning phase refers to a twisted condition of the input rotation member relative to the hub in the direction opposite engine rotation.

However, certain conditions under which an automobile is used therein call for assembly torsional characteristics wherein different hysteresis torque responses to positive versus negative torsioning phases are effected.

One damper disc assembly has been proposed having an wedge-like member interposed between a pressing member and a friction member. The wedge-like member is of varying sectional thickness and gives rise to reduced hysteresis torque response when the damper disc assembly reacts through the extent of a negative torsioning phase. However, this damper disc assembly requires such strict dimensional control of components in order to stabilize hysteresis torque response that it is impractical to achieve desired hysteresis torque characteristics.

SUMMARY OF THE INVENTION

It is an object of the present invention that different hysteresis torque characteristics are enabled stably in response to positive versus negative operational torsioning phases.

A damper disc assembly according to the present invention comprises an input rotation member, a hub, an elastic member, a plurality of friction members and a regulator. The hub includes a flange along its circumferential periphery and is connectable to an output member. The elastic member joins the input rotation member to the flange in circumferentially elastic connection. The plurality of friction members are sandwiched between the input rotation member and the flange wherein they induce a hysteresis torque response when the input rotation member twists relative to the flange. The regulator changes the number of friction member friction facings which are functional depending on whether the damper disc assembly operates in response to a positive torsioning phase or to a negative torsioning phase. Consequently, stable hysteresis torque is effected through the extent of a phase of positive torsioning differently from that effected through the extent of phase of negative torsioning over the characteristic torsional damping range of the assembly.

The foregoing and other objects, aspects and advantages of the present invention will become more apparent from the following detailed description, when taken in conjunction with the accompanying drawings.

DESCRIPTION OF THE PREFERRED EMBODIMENTS

Figure 1:
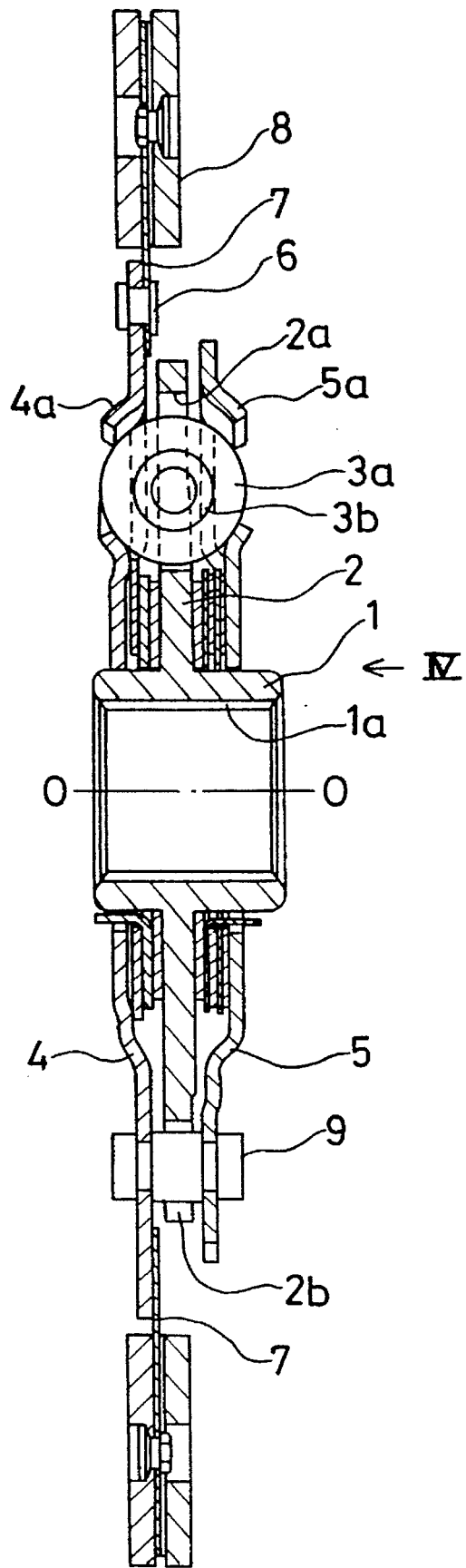
FIG. 1 is split-open, multiple-depth sectional view of a damper disc assembly according to an embodiment of the present invention taken along the sections indicated by line I—I in FIG. 4.
Figure 4:
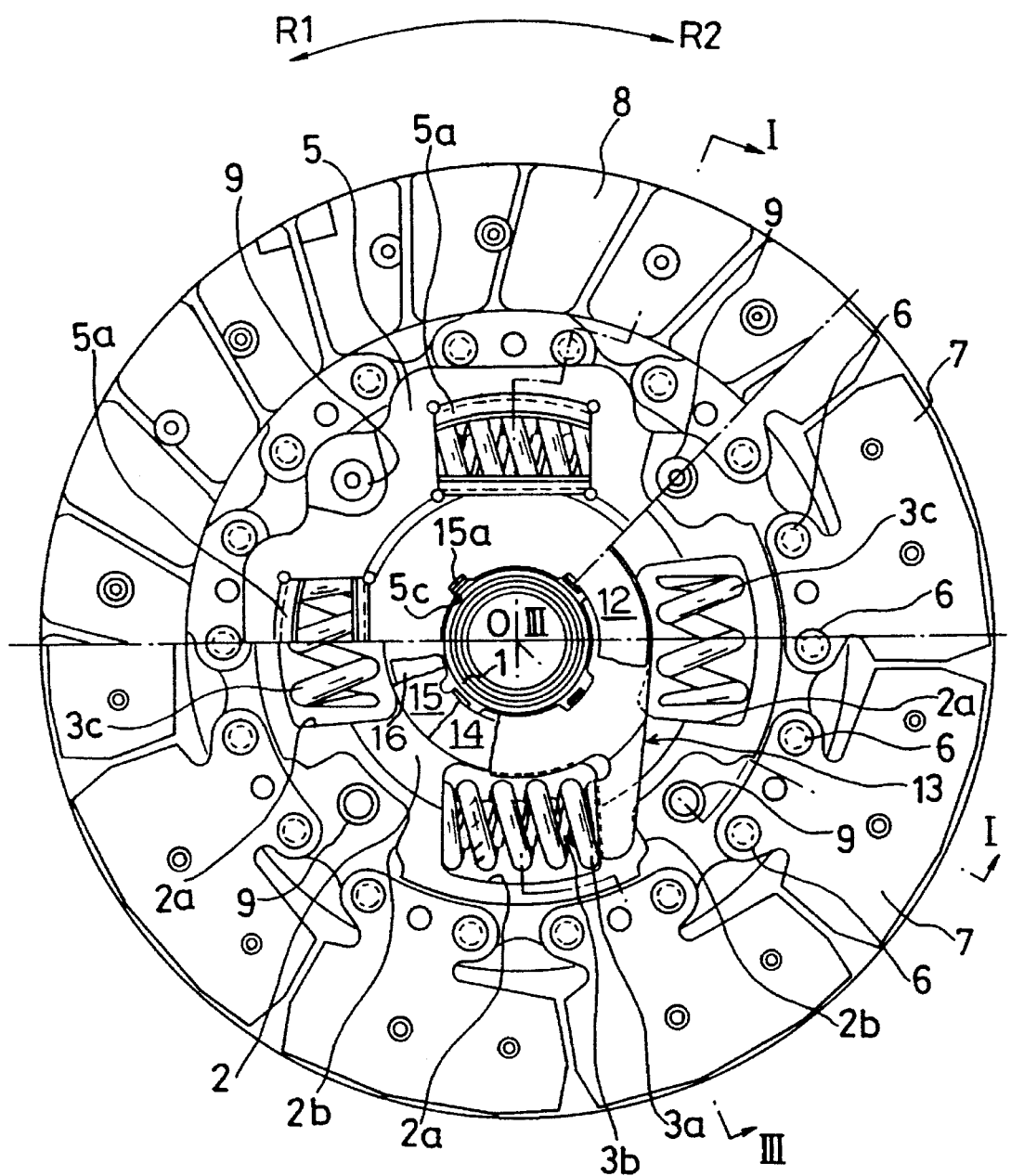
FIG. 4 is a view seen in the direction indicated by arrow IV of FIG. 1.

FIG. 1 and FIG. 4 show a damper disc assembly according to an embodiment of the present invention. The line O—O is the axis of rotation of the damper disc assembly.

In reference to the figures, a hub 1 is shown located at the center of the damper disc assembly. The hub 1 is provided with internal splines 1a for splined engagement with the main drive shaft of a transmission (not shown). A flange 2 is formed integrally around the periphery of the hub 1. Extending circumferentially near the rim of flange 2 are four circumferentially equidistant windows 2a. A notch 2b opening radially outward is formed between adjacent windows 2a.

A clutch plate 4 and a retaining plate 5 are located on either side laterally of the flange 2 of the hub 1. The plates 4 and 5 are disc plates rotatably fitted onto the periphery of the hub 1, and their outer margins extend beyond the flange 2. A plurality of cushioning plates 7 are fixed through rivets 6 to the rim of the clutch plate 4. Annular facings 8 are attached to the cushioning plates 7. The clutch plate 4 and the retaining plate 5 are connected through stud pins 9 along their rimward margins, each stud pin 9 passing through a corresponding of the notches 2b formed in the rim of the flange 2. When the stud pins 9 come into abutment against either lateral wall of the notch 2b, twisting of clutch plate 4 and the retaining plate 5 relative to the hub 1 is restricted.

Among the four windows 2a, two diametrically opposed windows 2a each contain two coil springs 3a and 3b. The larger diameter coil spring 3a contains the smaller diameter coil spring 3b therein. A coil spring 3c of relatively shorter length is contained in each of the remaining two windows 2a; the ends of the coil springs 3c are not in continuous contact with the circumferentially opposed walls of the windows 2a. The clutch plate 4 and the retaining plate 5 are formed with respective stamped-out portions 4a and 5a for axially supporting the coil springs 3a, 3b and 3c. These stamped-out portions 4a and 5a of the clutch plate 4 and the retaining plate 5 furthermore support the circumferentially opposed ends of the coil springs 3a and 3b.

The radially inward rims of the clutch plate 4 and the retaining plate 5 are provided with four nicks 4c and 5c.

Figure 2:
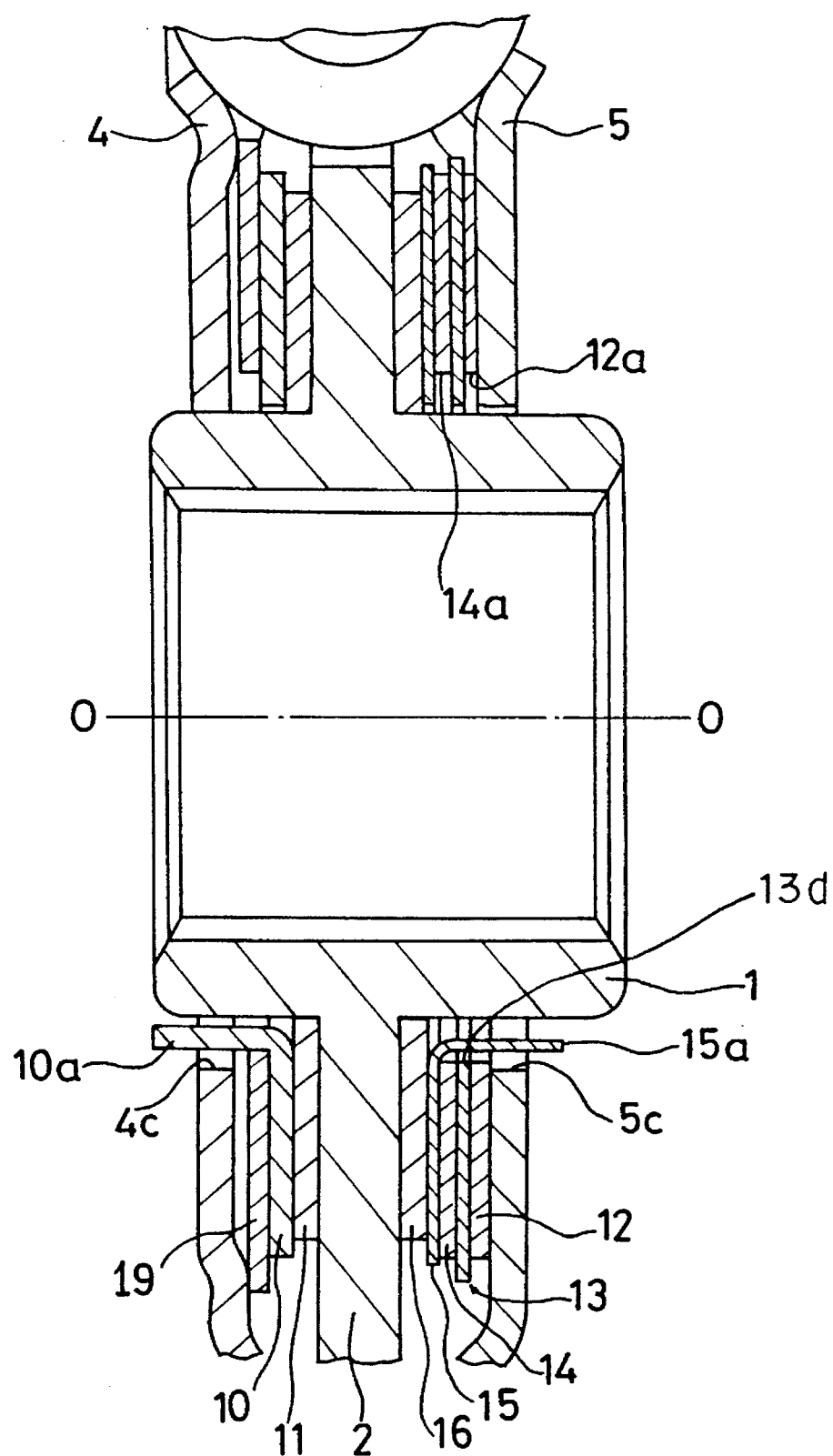
FIG. 2 is an enlarged partial view of FIG. 1.
Figure 3:
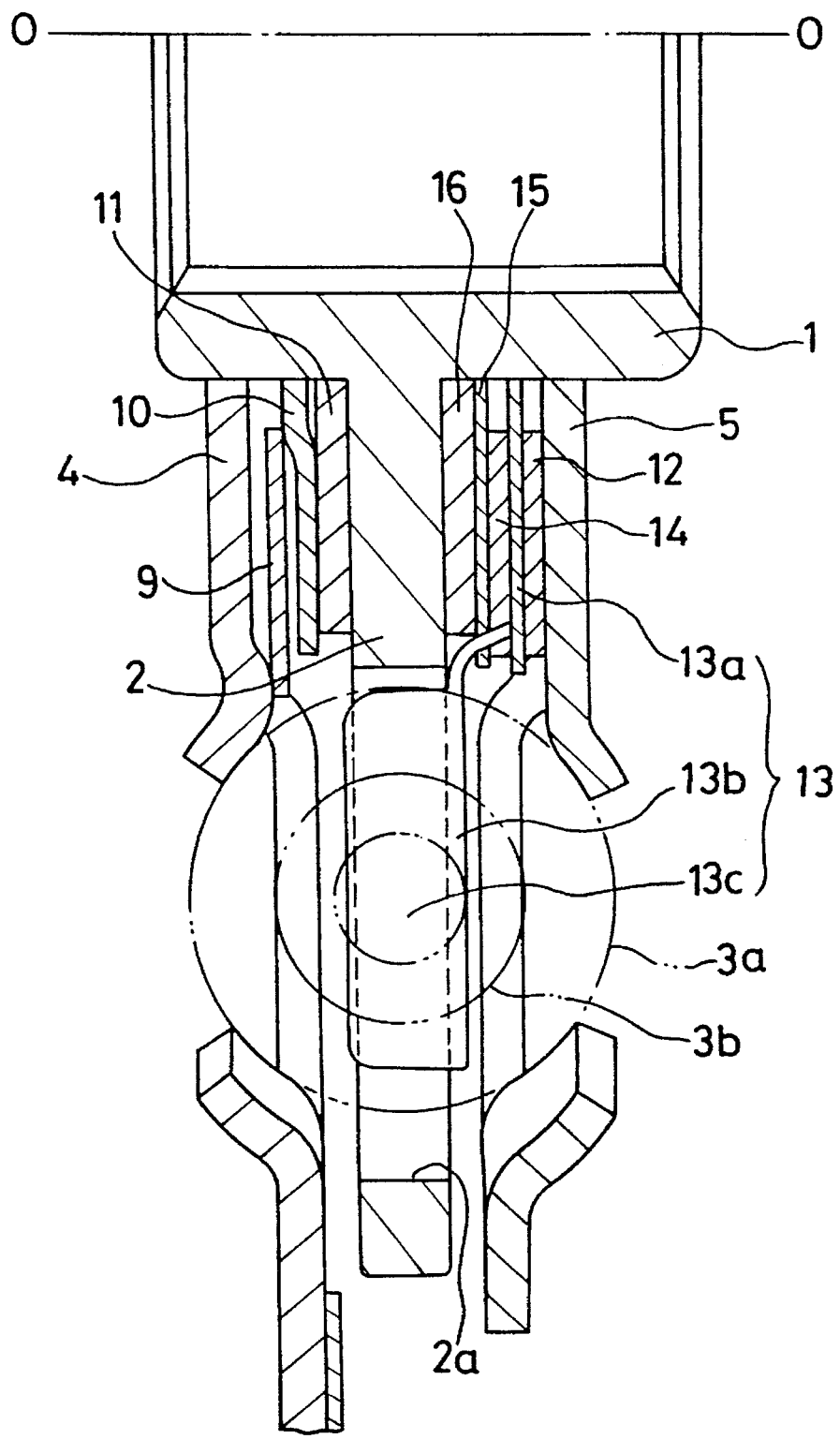
FIG. 3 is a partial section, taken along line III—III of FIG. 4.

Referring to FIG. 2 and FIG. 3, a hysteresis torque inducing mechanism according to this embodiment will be detailed.

Disposed between the radially inward margin of the clutch plate 4 and the radially adjacent face of the flange 2 are, from the clutch plate 4 side, an annular cone spring 19, a first friction plate (a first friction slider ring) 10, and a first friction (main) washer 11. The first friction plate 10 is formed with four bent portions 10a along its radially inward rim extending toward the clutch plate 4, wherein the bent portions 10a are fitted snugly into the nicks 4c of the clutch plate 4. That is, the first friction plate 10 is engaged with the clutch plate 4 such that the first friction plate 10 cannot rotate, but can move axially, relative to the clutch plate 4. The inner rim of the cone spring 19 urges the first friction plate 10 and the first friction washer 11 toward the flange 2 side (rightward in the figures), and its outer rim presses the clutch plate 4 in the opposite direction (leftward in the figures). The first friction washer 11 is pressed against the flange 2 by virtue of the urging force of the cone spring 19.

Disposed between the radially inward portion of the retaining plate 5 and the adjacent face of the flange 2 are, from the retaining plate 5 side, a second friction (sub) washer 12, a regulator plate 13, a second friction plate (a second friction slider ring) 15, and a fourth friction (main) washer 16. The regulator plate 13 is formed with cutouts 13d (indicated in FIGS. 5 and 6), corresponding to the four nicks 5c formed in the radially inward portion of the retaining plate 5 but extending further in the circumferential direction than the nicks 5c. The third friction plate 15 is provided with a plurality of bent portions 15a extending through the cutouts 13d and fitted snugly into the nick 5c. The second friction washer 12 and the third friction washer 14 have enlarged inside diameters 12a and 14a respectively, which allow the bent portions 15a to move circumferentially. That is, the second friction plate 15 is engaged with the retaining plate 5 such that the second friction plate 15 cannot rotate, but can move in the axial direction, relative to the retaining plate 5.

Figure 5:
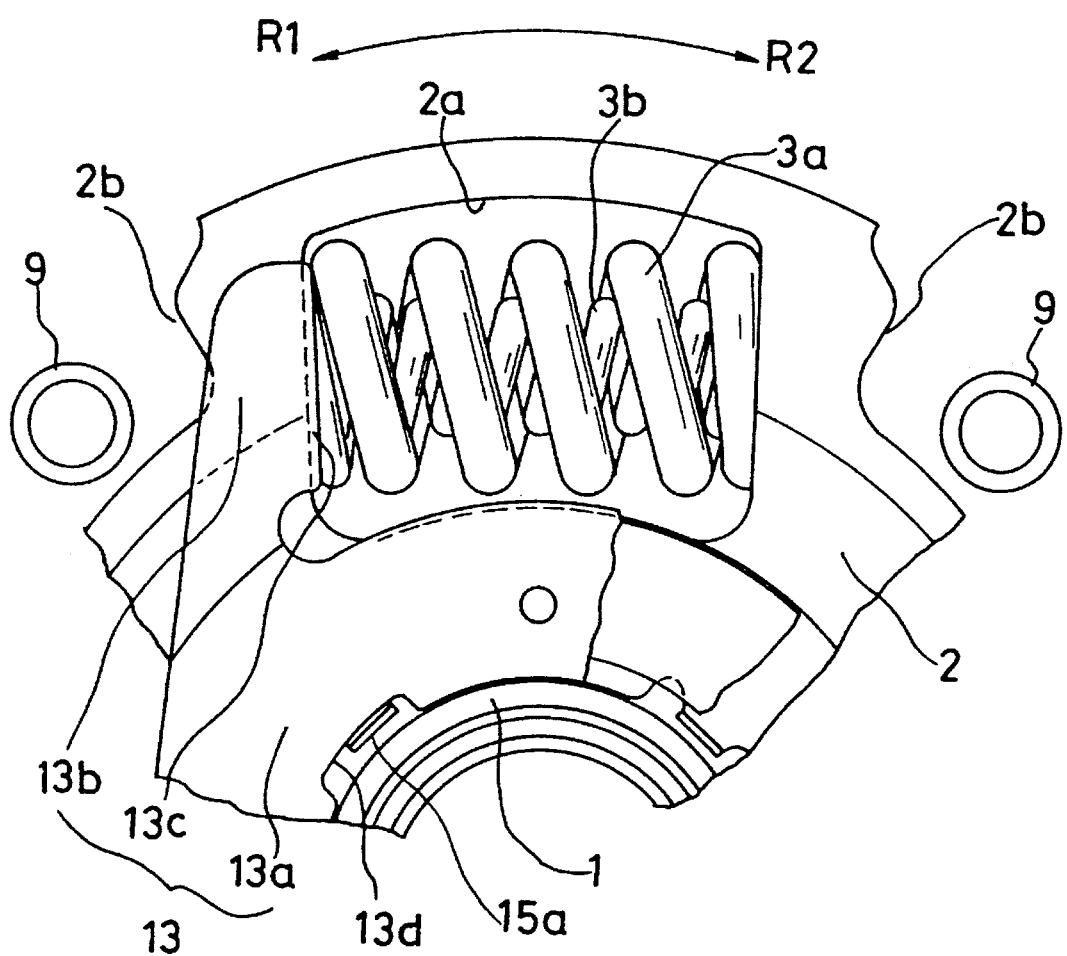
FIG. 5 is an enlarged partial view of FIG. 4.
Figure 6:
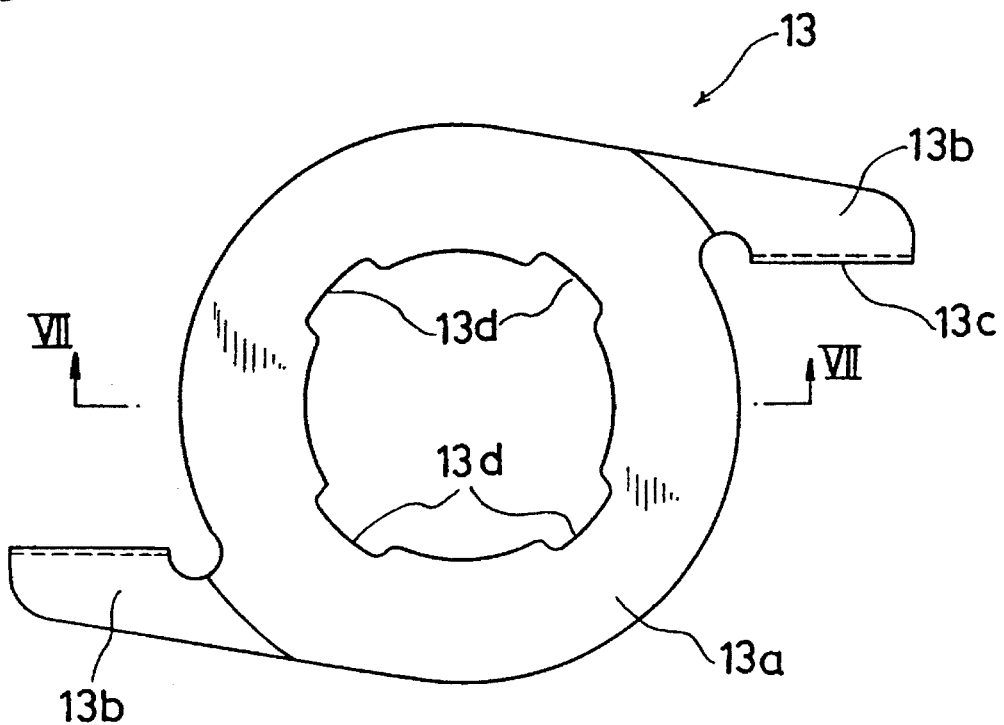
FIG. 6 is a plan view of a regulator plate.
Figure 7:
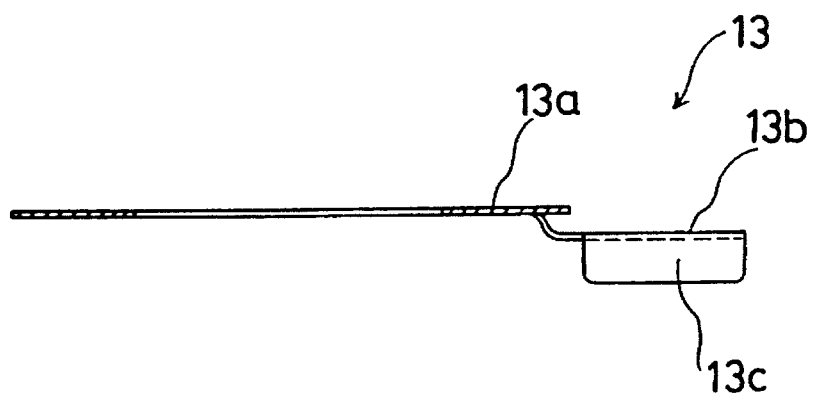
FIG. 7 is a cross-sectional view taken along the line VII—VII of FIG. 6.

Next, the regulator plate 13 acting as a regulating means will be explained. As is apparent from FIG. 6 and FIG. 7, the regulator plate 13 consists of a disc portion 13a, two projections extending tangentially outward from the disc portion 13a, and a rectangular claw 13c formed along the non-tangential edge of the projections 13b. As shown in FIG. 3, the disc portion 13a of the regulator plate 13 is interposed between the second friction washer 12 and the third friction washer 14. The claws 13c abut along the circumferentially positive direction (in the R1, or engine rotation, direction) against corresponding edges of the two windows 2a in which the coil springs 3a and 3b are contained, as shown in FIG. 5. The regulator plate 13 cannot rotate relative to the flange 2 in the direction R1 of positive rotation and can rotate in the direction R2 of negative rotation. The claws 13c are pressed against the circumferential direction end of the windows 2a by the coil springs 3a and 3b.

In the above-described structure, the second friction washer 12, the regulator plate 13, the third friction washer 14, the second friction plate 15 and the fourth friction washer 16 are pressed together, sandwiched between the retaining plate 5 and the flange 2. This results from the fact that the cone spring 19 urges the clutch plate 4 leftward, with respect to FIGS. 2 and 3, so that the retaining plate 5, which is connected to the clutch plate 4, is urged toward the flange 2.

Figure 8:
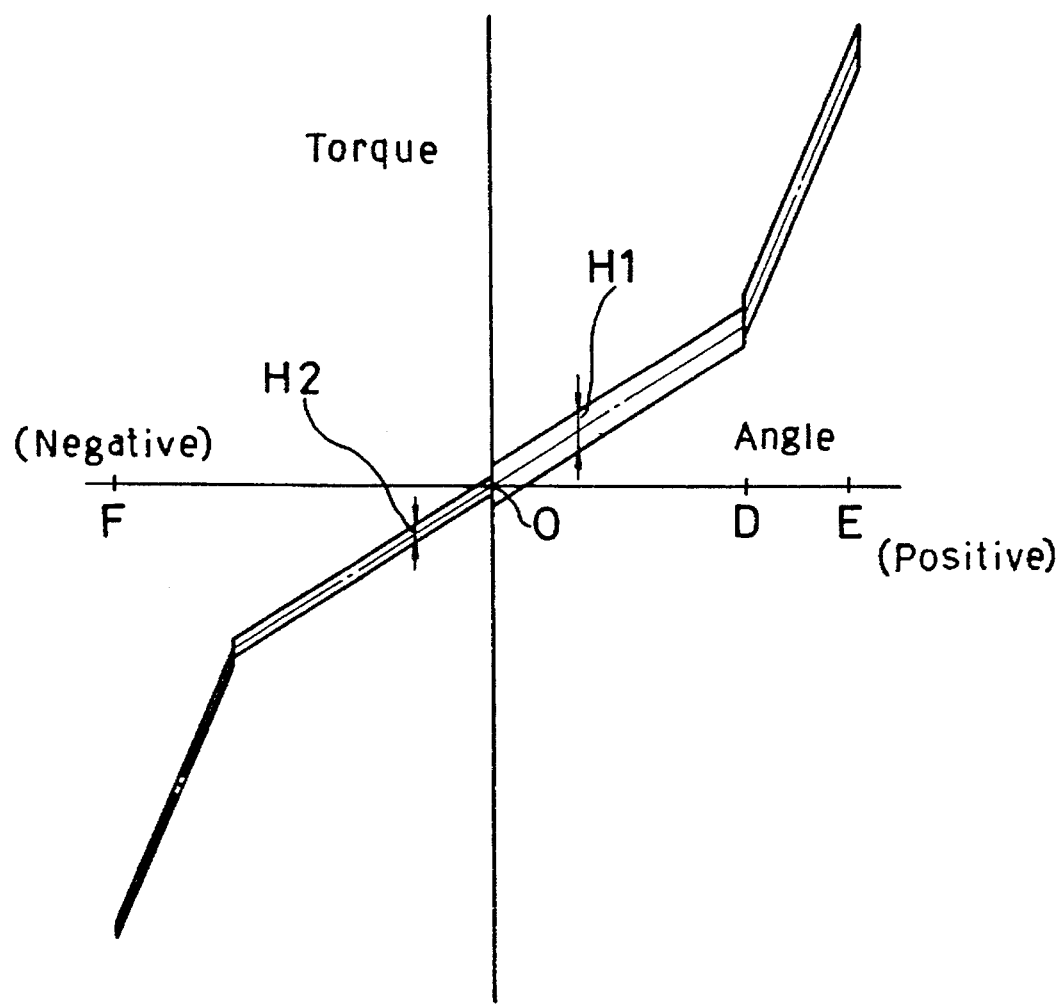
FIG. 8 is a diagram graphing torsional characteristics (torsional angle versus torque) of the damper disc assembly.

Referring to FIG. 8, the torsional damping characteristics of the damper disc assembly will be explained.

In the transmission of torque from the facing members 8 to the central hub 1, torque is first transmitted from the facings 8 to the clutch plate 4 and the retaining plate 5. Then, the torque is in turn transmitted to the hub 1 through the coil springs 3a, 3b and 3c. Torque fluctuations arising in the engine are transmitted to the damper disc assembly as torsional vibration. The coil springs 3a, 3b and 3c repeat compression and restoration movements whenever the clutch plate 4 and the retaining plate 5 twist relative to the hub 1. In functioning to dampen torsional vibration, the hysteresis torque inducing mechanism develops hysteresis torque suitably responsive to twisting as described above.

When the clutch plate 4 and the retaining plate 5 begin to twist relative to the hub 1 in the positive twisting direction R1 (refer to FIG. 5), the coil springs 3a and 3b are compressed within the window 2a of the flange 2 from the state shown in FIG. 5, wherein the components are in their neutral position. During this compression, the regulator plate 13 cannot twist relative to the flange 2 due to the abutment of its claw 13c against the flange 2 such that the clutch plate 4 and the retaining plate 5 twist relative to the regulator plate 13 while the regulator plate claws 13c are constrained against respective diametrically opposite adjacent edges of the windows 2a by the coil springs 3a and 3b. Accordingly the second friction washer 12, the third friction washer 14, and the regulator plate 13 therebetween, slide relative to each other. That is, after the clutch plate 4 and the retaining plate 5 begin to twist in the positive twisting direction R1, the friction washers 11 and 12 counterslide on the flange 2, and friction washers 14 and 16 counterslide against the regulator plate 13, developing large hysteresis torque H1, as diagramed in FIG. 8. Even if the clutch plate 4 and the retaining plate 5 should undergo negative countertwisting from the positively twisted state (which state is indicated by O-E in FIG. 8), the claw 13c is forced in the circumferentially positive direction against the adjacent edge of the window 2a by the coil springs 3a and 3b. Consequently, the regulator plate 13 and the hub 1 turn together in the positive twisting phase such that the hysteresis torque developed is constant.

When the torsional angle reaches a certain point (D), the coil springs 3c come into compression such that the torsional rigidity changes and the torque transmitted increases rapidly in proportion to the torsional angle between the clutch plate 4/the retaining plate 5 and the flange 2. When the stud pins 9 abut against the notches 2b of the flange 2 (point E), the clutch plate 4 and the retaining plate 5 begin to turn integrally with the hub 1.

Wherein the clutch plate 4 and the retaining plate 5 begin to twist in the negative twisting direction R2 from the neutral (FIG. 5) state, the coil springs 3a and 3b are then compressed in the direction R2. Since the regulator plate 13 can turn in the R2 direction from the flange 2 with the clutch plate 4 and the retaining plate 5, the disc portion 13a of the now idle regulator plate 13 thus remains held between the second friction washer 12 and the third friction washer 14. In other words, the second friction washer 12, the third friction washer 14, and the regulator plate 13 therebetween, do not twist relative to each other, but instead turn together sandwiched between and frictionally retained by the retaining plate 5 and the second friction plate 15. Thus, under the pressure of the cone spring 19, only the two friction main washers (the first friction washer 11 and the fourth friction washer 16), develop hysteresis torque in the negative twisting phase. Decreasing the number of frictional damping washers which function in the negative twisting direction R2 decreases the friction surfaces, which thereby in the damping response develops hysteresis torque H2 less than hysteresis tongue H1 under the positive twisting phase. Even if the clutch plate 4 and the retaining plate 5 countertwist in the positive direction during the negative twisting phase (which state is indicated by O-F), the claws 13c of the regulator plate 13 are not urged by the coil springs 3a and 3b, such that the claws 13c are free to move away from the circumferentially adjacent edges of the window 2a. Accordingly, the regulator plate 13 nonetheless is turned by its frictional adhesion as sandwiched between the second and third friction washers 12 and 14 together with the clutch plate 4 and the retaining plate 5 in the negative twisting phase, such that the hysteresis torque developed is constant.

The regulator plate 13, after it rotates in direction R2 from the FIG. 5 state is returned to the neutral position therein by the coil springs 3a and 3b when the clutch plate 4 and the retaining plate 5 return to the neutral position.

Various details of the invention may be changed without departing from its spirits nor its scope. Furthermore, the foregoing description of the embodiments according to the present invention is provided for the purpose of illustration only, and not for the purpose of limiting the invention as defined by the appended claims and their equivalents.

What is claimed is:

1. A damper disc assembly, comprising:

an input rotation member;

a hub connectable to an output member, having a radially extending flange;

an elastic member joining said input rotation member and said flange in circumferentially elastic connection, said input rotation member being movable with respect to said flange in a region definable by two angular movements lying on opposite sides of a neutral position, a first angular movement counter-clockwise of said neutral position, and a second angular movement clockwise of said neutral position;

a plurality of friction members sandwiched between said input rotation member and said flange, for inducing hysteresis torque response when said input rotation member twists relative to said flange, said plurality of friction members including first, second, and third friction washers interposed between said flange and said input rotation member;

a first engagement plate which is interposed between said first friction washer and said input rotation member and rotates with said input rotation member, said first engagement plate including a projection extending from an inner rim thereof toward said input rotation member, said input rotation member being formed with a radially inward nick into which said projection is fitted;

a regulating means for controlling a number of friction facings of the friction members functional within said two angular movements of said input rotation member with respect to said flange, said number of friction facings being larger during said first angular movement and lower during said second angular movement, whereby a first damping torque generated during said first angular movement is larger than a second damping torque generated during said second angular movement; and a regulator plate disposed among said plurality of friction members, said regulator plate being interposed between said second and third friction washers and rotating opposite said second and third washers during said first angular movement whereby a damping torque is produced, and rotating with said second and third washers during said second angular movement whereby no damping torque is produced.

2. A damper disc assembly according to claim 1, further comprising:

a second engagement plate which is interposed between said flange and said second and third friction washers, and is rotatable together with said input rotation member, said second engagement plate including a projection extending from an inner rim thereof; wherein along an inner rim of said regulator plate a notch is formed which receives said projection of said second engagement plate, allowing it circumferential play.

3. A damper disc assembly according to claim 1, further comprising an urging member for urging said input rotation member against said flange through said first, second and third friction washers.

4. A damper disc assembly according to claim 3, wherein said input rotation member is composed of a pair of disc plates disposed laterally of said flange and connected to each other along their radially outward peripheries; and said urging member is located between one of said disc plates and said flange wherein said first is located while said second and third friction washers are located between the other of said disc plates and said flange; said urging member urging said one of said disc plates such that said the other of said disc plates is pressed in a direction toward said first, second and third friction washers.

5. A damper disc assembly according to claim 4, further comprising:

a fourth friction washer interposed between said second engagement plate and said flange: wherein said urging member urges said second engagement plate against said flange through said fourth friction washer.

6. A damper disc assembly according to claim 5, wherein said urging member is a cone spring.

7. A damper disc assembly according to claim 1, wherein said input rotation member is composed of a pair of disc plates disposed laterally of said flange, said damper disc assembly further comprising:

a pin connecting radially outer peripheries of said pair of disc plates, wherein along the radially outward margin of said flange a cutout is formed receiving said pin and allowing it circumferential play.

8. A frictional damping assembly in a clutch, comprising:

a hub having a radially extending flange;

a rotary input assembly, including a clutch plate joined circumferentially to a retaining plate, said rotary input assembly concentrically encompassing said hub, wherein said flange is at least partially interposed between axially opposed faces of said clutch plate and said retaining plate;

at least one elastic member disposed between said rotary input assembly and said flange, said elastic member being compressible in response to relative displacement between said rotary input assembly and said flange occurring in a first rotary direction ($R_1$) and in a second rotary direction ($R_2$) counter-rotational to said first rotary direction ($R_1$);

first and second friction main washers disposed on respective axially opposite, radially extending faces of said flange;

a first friction slider ring disposed against the first friction main washer, between said first friction main washer and said clutch plate, said first friction slider ring having axially extending arms engaged in corresponding circular notches in said clutch plate for unitary rotation therewith;

a second friction slider ring disposed against the second friction main washer, between said second friction main washer and said retaining plate, said second friction slider ring having axially extending arms engaged in corresponding circular notches in said retaining plate for unitary rotation therewith, wherein during relative displacement between said rotary input assembly and said flange in said first rotary direction ($R_1$) and in said second rotary direction ($R_2$), relative rotary sliding of the first and second slider rings, said first and second friction main washers, and said flange generates a main-damping hysteresis response;

a regulator plate concentrically encompassing said hub and interposed between said retaining plate and said second friction slider ring, said regulator plate having at least one tangentially extending arm, said arm being provided with an engagement extension interposed between said elastic member and said flange such that said regulator plate is constrained to turn with said flange during relative displacement between said rotary input assembly and said flange in said first rotary direction ($R_1$), and such that said regulator plate is idle during relative displacement between said rotary input assembly and said flange in said second rotary direction ($R_2$);

first and second friction sub-washers interposed between said retaining plate and said second friction slider ring, said regulator plate therein being sandwiched between said first and second friction sub-washers; wherein during relative displacement between said rotary input assembly and said flange in said first rotary direction ($R_1$), relative rotary sliding of said regulator plate together with said flange, said second friction slider ring together with said retaining plate, and said first and second friction sub-washers generates a sub-damping hysteresis response; and during relative displacement between said rotary input assembly and said flange in said second rotary direction ($R_2$), said regulator plate being idle, said sub-damping hysteresis response is not generated.

9. A damper disc assembly according to claim 8, wherein said regulator plate has a pair of substantially parallel regulator arms extending in opposite directions, each of said regulator arms being provided with a claw in the same circumferential direction so that said regulator plate is movable separately from said flange in only said second rotary direction ($R_2$).

10. A damper disc assembly according to claim 8, wherein said elastic member is formed of a plurality of coil springs arranged in windows in said rotary input assembly and said flange, each of said coil springs having diametrically opposite ends one of which being attached to said rotary input assembly and other end of which being attached to said flange.

11. A damper disc assembly according to claim 8, wherein said clutch plate and said retaining plate are disposed laterally of said flange and connected to each other along their radially outward peripheries by a plurality of stud pins.

* * * * *